Jan. 26, 1943.  F. W. CURTIS  2,309,241
DIVIDING HEAD
Filed Feb. 4, 1941   3 Sheets-Sheet 1
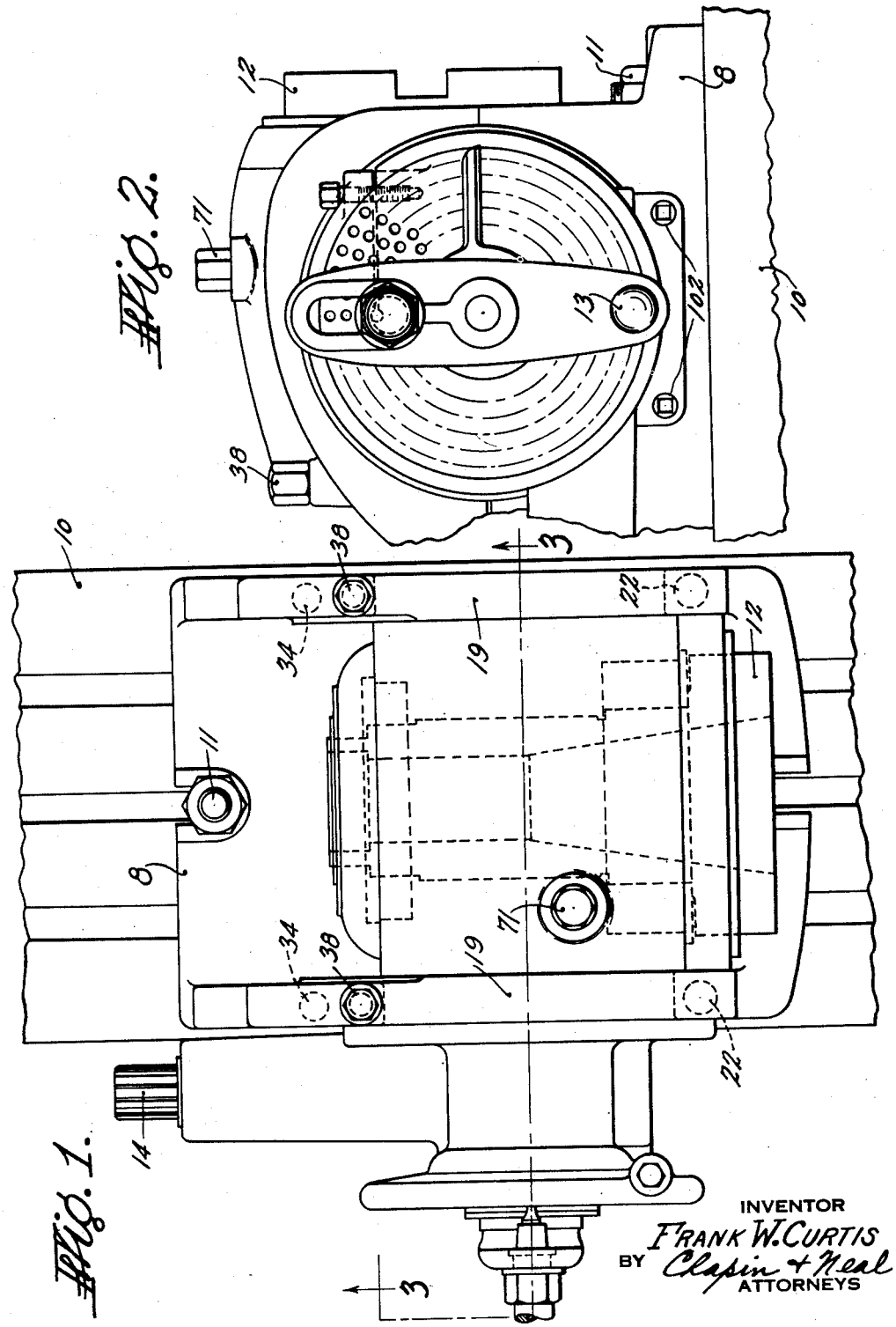
INVENTOR
FRANK W. CURTIS
BY Chapin + Neal
ATTORNEYS Jan. 26, 1943.   F. W. CURTIS   2,309,241
DIVIDING HEAD
Filed Feb. 4, 1941   3 Sheets-Sheet 2
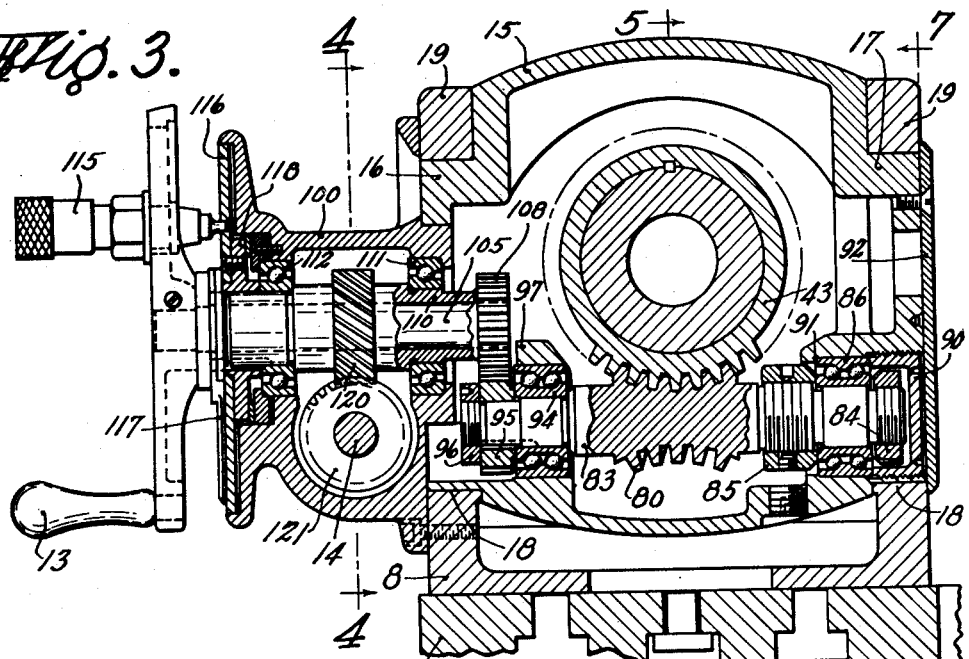
INVENTOR
FRANK W. CURTIS
BY Chapin + Neal
ATTORNEYS Jan. 26, 1943.　　　　F. W. CURTIS　　　　2,309,241
DIVIDING HEAD
Filed Feb. 4, 1941　　　　3 Sheets-Sheet 3
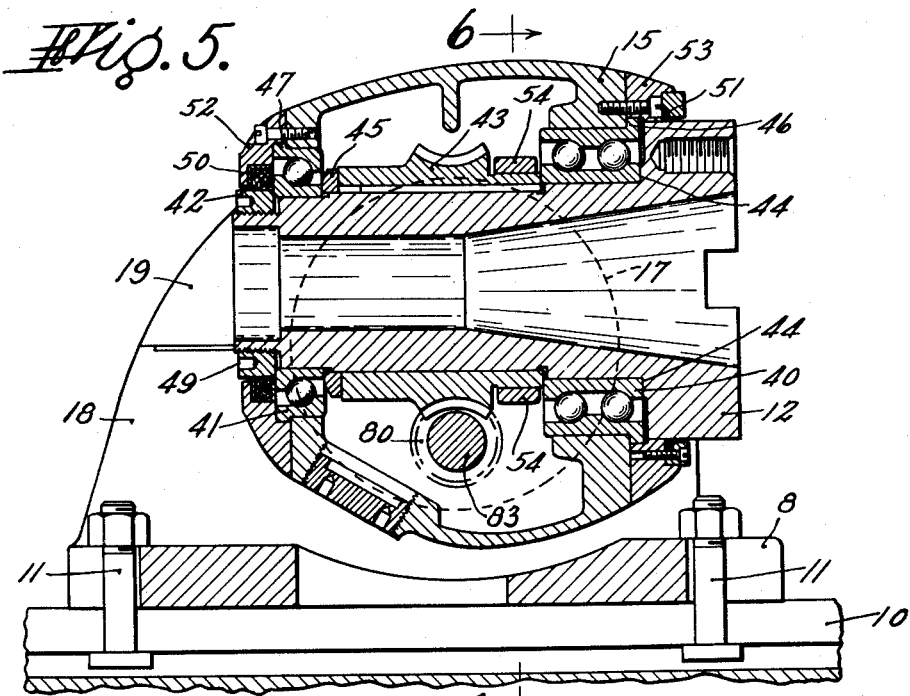
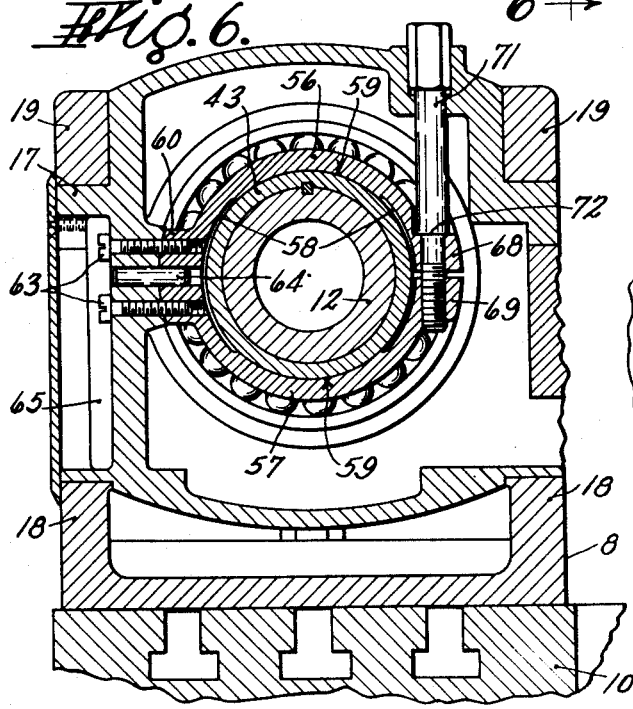
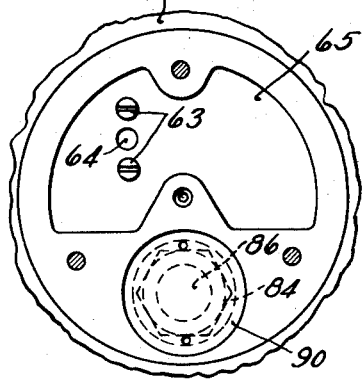
INVENTOR
FRANK W. CURTIS
BY Clapin + Neal
ATTORNEYS Patented Jan. 26, 1943

2,309,241

UNITED STATES PATENT OFFICE 2,309,241

DIVIDING HEAD

Frank W. Curtis, Springfield, Mass., assignor to Van Norman Machine Tool Company, Springfield, Mass. a corporation of Massachusetts Application February 4, 1941, Serial No. 377,365

5 Claims. (Cl. 90—57)

This invention relates to a dividing head for use as an attachment on machine tools.

One object of the present invention is to provide a dividing head of improved construction which is easily and accurately adjusted for various index operations. An additional object is to provide a dividing head having an improved driving arrangement for the work spindle. A further object is to provide a dividing head having improved clamping means for the trunnions supporting the work spindle for swiveling adjustment. A further object is to provide improved clamping means for locking the work spindle in any position of rotary adjustment. An additional object is to provide improved means for indicating the angular adjustment of the work spindle when it is adjusted on its trunnions. Additional objects will appear from the following description and claims.

How I accomplish the above and other objects will be clear from a reading of the following specification and claims taken in conjunction with the accompanying drawings, in which:

Fig. 1 is a top plan view of the dividing head;

Fig. 2 is a side elevation;

Fig. 3 is a sectional elevation taken on line 3—3 of Fig. 1 showing part of the drive for the work spindle;

Fig. 4 is a view taken on line 4—4 of Fig. 3;

Fig. 5 is a sectional view on line 5—5 of Fig. 3 showing the bearing arrangement for the work spindle;

Fig. 6 is a view taken on line 6—6 of Fig. 5 and showing the spindle clamping means; and Fig. 7 is a fragmentary view taken on line 7—7 of Fig. 3.

Referring to Figs. 1, 2 and 4 I have shown the dividing head as mounted on the table 10 of a milling machine by bolts 11 extending from the base 8 of the head into the T slots of the table in the well known manner. The dividing head includes a spindle 12, rotatable around its longitudinal axis by hand through manual operation of a handle 13 or by power through suitable connection between a shaft 14 and some convenient source of rotating power on the machine. In addition, as is common with these devices, the spindle may be swiveled or tilted about an axis which is transverse to its longitudinal axis.

As shown in Figs. 3 to 5, the spindle 12 is carried in a body member 15 which is provided with a pair of trunnions 16 and 17. These trunnions are journaled for rotation of the body in bearings formed in the base 8. Each bearing consists of a lower saddle portion 18 having a semi-circular bearing surface formed integrally with the base and a cap member 19 having a semi-circular bearing surface. At one end each cap member 19 is secured to its saddle 18 by means of a bolt 22, passing up through a hole in the base 8 and threaded into the cap as at 23. The head of the bolt 22 engages a shoulder as at 25 so that the cap and saddle are drawn snugly together.

At the opposite end, each saddle 18 is relieved as shown at 30 from a point at its inner semi-circular bearing surface to a point just short of its outer surface, leaving an abutment in the form of a step 31. This step forms a rest for the end of the cap 19. Between the step and the inner circumference there is provided a hole 32 in the base 8 which is aligned with a hole 33 in cap 19. A dowel pin 34 has its ends fitted in these holes and accurately aligns this end of the cap and saddle. Still further towards the inner circumference, is provided a locking bolt 38 passing freely down through a hole in the cap and threaded into the saddle as at 39 with its head engaging the cap as shown.

With the parts arranged as described the spindle can be tilted or swiveled by hand around a transverse axis passing through the trunnions 16 and 17 and can be locked in its adjusted position by tightening bolt 38. Pressure due to the tightening draws the inner edge of the cap downward and wraps the cap tightly around the trunnion because the outer end of the cap is supported on the step 31. This results in very efficient locking of the position of the body member without undue force on the bolt 38. Also, because of the dowel 34, the bearing cap is always accurately aligned and the cap cannot shift laterally when the bolt is loosened and thereby cause the trunnions to bind when the spindle is being swiveled.

As appears in Fig. 5, the spindle 12 is carried by front and rear bearings 40 and 41, of which the former is a double row ball bearing, and both front and rear bearings are arranged to take care of radial and thrust loads. Keyed to the spindle is a worm wheel 43 of the "hour glass" or cone type (Fig. 3) which at one end abuts the inner race of the front bearing and at the other end is spaced from the inner race of the rear bearing by spacer 45. A cylindrical nut 42 is threaded on the rear end of the spindle as shown and holds the bearings, spacer, and worm wheel against the shoulder 44 at the front of the spindle. Bearings 40 and 41 are supported radially in holes formed in the end walls of the body 15 while end thrust is taken by shoulders 46 and 47. Spacer 45 is dimensioned so that, when nut 42 is tightened snugly by a wrench engaged in holes 49, bearings 40 and 41 will have a heavy pre-load. Packing members 50 and 51 are carried in cap members 52 and 53 attached to the body as shown and prevent dirt and other foreign matter from working into the bearings. This assembly gives a very sturdy and rigid spindle bearing mounting.

Mounted on the hub of the worm wheel 43 between the front bearing and the teeth on the wheel is a binding member 54 for locking the spindle against rotation around its longitudinal axis (Figs. 5 to 7). This binding member consists of a split ring having upper and lower halves 56 and 57 which embrace the hub of the worm wheel 43. These halves are relieved as shown at 58, thus forming engaging portions 59 each of which contacts the surface of the hub only through a portion of the circumference which is preferably substantially equal to ¼ of the total.

Opposite the split, the ring is provided with an anchorage 60 and at this point is attached to trunnion 17 by screws 63 and dowel pin 64, which pass through the bottom of a recess 65 formed in the trunnion. Adjacent the split, the ring halves are formed with lugs 68 and 69. A locking bolt 71 having a shoulder 72 passes loosely through holes in the body 15 and the lug 68 and is threaded into the lug 69. Shoulder 72, as indicated, engages the upper surface of lug 68 and when the bolt is tightened draws the two halves together to lock the spindle against rotation.

As will be clear from the drawings, due to the fact that the halves 56 and 57 are formed with engaging portions 59 which as shown are located with their midpoints substantially halfway between the anchorage 60 and the split, the force during this clamping will be directed substantially along a line radial to the longitudinal axis of the spindle. Because of this, there is no tendency on the part of the spindle to creep during clamping and the spindle will remain accurately positioned during this operation.

I will now describe the driving means for rotating the spindle. As shown in Figs. 3, 5 and 7, worm wheel 43 is engaged by a worm 80 journaled transversely of the body on an axis extending through the trunnions 16 and 17 and below the axis of the trunnions. The worm is of the hour glass type and may be formed integrally on a shaft 83. At one end this shaft has secured to it, as by lock nuts 84 and 85, a ball bearing 86, the bearing being mounted in a hole formed in trunnion 17 and held in position by a nut 90 threaded into the hole and pressing the outer race of the bearing against a shoulder 91. A cover 92 is attached to the trunnion 17 as shown and serves to prevent admission of dirt to the bearing mounting.

At the opposite end shaft 83 carries a ball bearing 94 which is held against a shoulder on the shaft by a spur gear 95 keyed to the shaft and forced against the bearing by a nut 96. This bearing is slidably supported in a boss 97 in the body 15.

Trunnion 16 has an opening formed in it into which protrudes a casing 100 fixed to the base 8 as by bolts 102, see Figs. 3 and 4. Mounted in this casing on the axis of the trunnions is a drive shaft 105 to which handle 13 is attached at one end, as indicated. At the opposite end, shaft 105 has affixed thereto a spur gear 108 meshing with gear 95. A sleeve 110 mounted in ball bearings 111 and 112 secured to the casing supports shaft 105 for rotation. The usual index pin 115 is provided for cooperation with one of a series of holes in an index plate 116 attached to a driving plate 118 keyed to the sleeve 110. Quadrant arms 117 are mounted as shown between the handle 13 and the index plate for manual indexing in the well known manner. Thus in the position shown in Fig. 3, if sleeve 110 is driven from the milling machine the spindle will be driven by power through the index plate, handle 13, shaft 105, worm 80, and worm wheel 43. If the index pin is withdrawn from the hole in the index plate, the spindle can be turned manually by the handle.

Referring now to Figs. 3 and 4, sleeve 110 has fixed thereto in any suitable manner a spiral gear 120 which meshes with another spiral gear 121 fixed for rotation with shaft 14. Shaft 14 is mounted for rotation in the casing 100 by means of bearings 130, 131, and 132. As is shown, bearings 130 and 131 are ball bearings and are mounted on shaft 14 closely adjacent spiral gear 121 and on opposite sides thereof as shown with the result that sufficient rigidity is given shaft 14 so that the outer bearing 132 can be a needle bearing.

Among the features of the above described drive is the fact that the driving gears 120 and 121 as well as the worm gear and spindle are "straddle mounted" to rotate on ball bearings which are located on either side of the gears. This "straddle mounting" produces a very sturdy structure which is well adapted to withstand heavy strains which may be encountered when the index head is being driven in synchronism with the feed of the table. Because of this, there is less loose motion between the parts of the driving mechanism and the dividing head will maintain its accuracy and produce better results than in similar structures where straddle mounted gears are not used. In addition to this the final driving members, that is the worm and worm wheel, are of the hour glass type and will not develop lost motion over long periods of usage.

In addition to the foregoing, I have provided another feature which makes for an improved dividing head. Thus, referring to Figs. 3 and 4, casing 100 is provided with a sight opening 135 which opens onto the front face of trunnion 16. The trunnion has indicia 140 inscribed on this face which is used with a reference line 141 inscribed on the casing to indicate the swiveled position of the head. With this structure the head can be assembled without the reference line marked on the casing and then after any necessary adjustments have been made the body 15 can be accurately set with the longitudinal axis horizontal and the reference line inscribed on the casing. The dividing head can then be set to any angle to swivel with a high degree of accuracy.

I claim:

1. In a dividing head, a body, a spindle mounted in the body for rotation about a longitudinal axis, trunnions on the body having a common axis transverse to the longitudinal axis, a base, saddles on the base one for each trunnion and having a semi-circular bearing surface for the trunnions, cap members one for each saddle and having semi-circular bearing surfaces complementary to the bearing surfaces of the saddles, means to draw each cap and saddle member toward each other to lock the trunnion against rotation comprising flat abutting surfaces formed at one end of each saddle and cap, means to hold said surfaces together, flat abutting surfaces on the opposite end of said cap and saddle, the last mentioned abutting surface on the saddle comprising a flat step formed near the outer edge of the saddle and supporting the flat abutting surface of the cap at its outer edge, a relieved portion extending from the step inwardly to the saddle bearing surface, and means located between said step and inner bearing surface for adjustment to draw said cap and saddle towards each other.

2. In a dividing head, a body, a spindle mounted in the body for rotation about a longitudinal axis, trunnions on the body having a common axis transverse to the longitudinal axis, a base, saddles on the base, one for each trunnion, and having a semi-circular bearing surface for the trunnions, cap members one for each saddle and having semi-circular bearing surfaces complementary to the bearing surfaces of the saddles, means to draw each cap and saddle member toward each other to lock the trunnion against rotation comprising flat abutting surfaces formed at one end of each saddle and cap, means to hold said surfaces together, flat abutting surfaces on the opposite end of said cap and saddle, the last mentioned abutting surface on the saddle comprising a flat step formed near the outer edge of the saddle and supporting the flat abutting surface of the cap at its outer edge, a relieved portion extending from the step inwardly to the saddle bearing surface, means located between said step and inner bearing surface for adjustment to draw said cap and saddle towards each other and additional means for maintaining the last named ends of said cap and saddle in alignment during adjustment of said last named means.

3. In a dividing head, a body, a spindle rotatably mounted in the body and having a cylindrical clamping surface, a clamping member for encircling said clamping surface and comprising a split ring secured to the body opposite the split, a pair of lugs on said ring one on each side of said split, and means to engage the lugs and draw them towards each other to close the split and engage the ring and clamping surface, the inner surface of said ring comprising clamping surface engaging portions and relieved portions, the midpoint of each of said engaging portions being located substantially halfway between the split and the point at which the ring is secured to the body.

4. In a dividing head, a body, a spindle rotatably mounted in the body and having a cylindrical clamping surface, a clamping member for encircling said clamping surface and comprising a split ring secured to the body opposite the split, a pair of lugs on said ring one on each side of said split, and means to engage the lugs and draw them towards each other to close the split and engage the ring and clamping surface, the inner surface of said ring comprising clamping surface engaging portions and relieved portions, the midpoint of each of said engaging portions being located substantially halfway between the split and the point at which the ring is secured to the body, and each comprising substantially one-quarter of the perimeter of said clamping surface.

5. A dividing head comprising a base portion, a body portion mounted on the base portion, a spindle rotatably mounted in the body portion and means to drive said spindle comprising a worm wheel mounted on the spindle, a first shaft at right angles to the spindle and journaled at its ends in anti-friction bearings, a worm on said shaft intermediate the bearings and meshing with the worm wheel, a second shaft in driving engagement with the first shaft, a gear mounted on the second shaft intermediate the ends of the shaft and adapted to be place in driving engagement with said shaft and journaled on anti-friction bearings mounted adjacent either side of the gear, a main driver for connection to a source of power, a gear meshing with the first gear and mounted adjacent the end of the driver, and anti-friction bearings mounted on the shaft at either side of the last gear adjacent said gear whereby said worm and worm wheel and said two gears are carried on straddle mounted bearings for power rotation of the spindle.

FRANK W. CURTIS.